United States Patent [19]
Little

[11] 3,888,684
[45] June 10, 1975

[54] ALGICIDAL ROOFING GRANULES

[75] Inventor: David C. Little, Hagerstown, Md.

[73] Assignee: GAF Corporation, New York, N.Y.

[22] Filed: Oct. 25, 1972

[21] Appl. No.: 300,876

[52] U.S. Cl.............. 106/15 AF; 106/308 B; 71/67
[51] Int. Cl............................................... C09k 3/00
[58] Field of Search .......... 117/100 D, 27, 70 S, 87, 117/88, 32, 140 A; 106/15 AF

[56] References Cited
UNITED STATES PATENTS

| | | | |
|---|---|---|---|
| 3,476,577 | 11/1969 | Davie........................... | 106/15 AF X |
| 3,494,727 | 2/1970 | Rapaport..................... | 106/15 AF X |
| 3,507,676 | 4/1970 | McMahon........................ | 117/25 X |
| 3,528,842 | 9/1970 | Skadulis....................... | 117/100 S X |

FOREIGN PATENTS OR APPLICATIONS

| | | | |
|---|---|---|---|
| 491,238 | 3/1953 | Canada............................ | 106/15 AF |
| 705,367 | 3/1965 | Canada................................. | 117/27 |

OTHER PUBLICATIONS
Chem. Abstracts, Vol. 51, col. 4,637, section (f), Walter Ure.

*Primary Examiner*—William D. Martin
*Assistant Examiner*—Dennis C. Konopacki
*Attorney, Agent, or Firm*—Walter C. Kehm; J. J. Ward

[57] ABSTRACT

The continued effectiveness of algicidal roofing granules in retarding the growth of algae and/or fungi over extended periods of time when employed in roofing surfaces exposed to atmospheric weathering conducive to the growth of such algae and/or fungi is enhanced by the provision of two fully water insolubilized silicate-clay coatings each containing algicidal compounds, with the inner insolubilized coating having a greater algicidal content than the outer insolubilized coating. The algicidal compounds employed are zinc algicides, copper algicides or mixtures thereof. Advantageously, the inner coating will have an algicidal content of at least about twice the algicidal content of the outer coating. The desired toxic effect in inhibiting the biological growth of algae and/or fungi is enhanced by employing both copper and zinc algicides in the overall algicidal content of the coatings. The release of the zinc and copper ions during periods of rain and dew, and the consequent leaching of such ions from the color coatings, produces a bimetallic toxic effect that is particularly useful in enhancing the resistance of roofing surfaces containing such granules to unsightly algae and/or fungi discoloration. The fully insolubilized coatings provide highly desirable weathering characteristics without undesired loss of algicidal material, but are sufficiently moisture permeable so that the desired leaching of algicidal ions, particularly a combination of zinc and copper ions, is achieved at a highly effective rate that nevertheless permits the desired leaching of algicidal ions to continue at an effective rate over the extended periods of time required for acceptable discoloration prevention over the anticipated life of the roofing surface.

10 Claims, No Drawings

ALGICIDAL ROOFING GRANULES

BACKGROUND OF THE INVENTION

1. Field of the Invention

This invention relates to algicidal roofing granules. More particularly, it relates to algicidal roofing granules having an enhanced ability to retard the growth of algae and/or fungi over extended periods of time.

2. Description of the Prior Art

Roofing granules, both natural and artificially color-coated granules, are extensively used in roll roofing and asphalt shingle compositions. The roofing granules are generally embedded in the asphalt coating on the surface of an asphalt-impregnated salt base material, the granules thus forming a coating that provides an adherent, weather-resistant exterior roofing surface. As this outer granule coating also provides the esthetic effect observable with respect to the roofing composition, the appearance of the granules is of major marketing interest. For this reason, therefore, a pigmented color coat is ordinarily applied to the base mineral granules to enhance their visual, decorative effect.

As white or light-colored roofs are particularly favored in warmer climates, $TiO_2$ pigment is commonly used in the production of light color-coated roofing granules. In such warmer climates, as in the southern part of the United States, discoloration of asphalt roofing compositions by the growth of algae and/or fungi is of particular concern. Such discoloration, of course, is particularly noticeable on the white or light-colored roofs otherwise so desired and popular in such regions. Upon discoloration, the roof becomes unsightly in appearance and is found to cause a greater heat absorbence as, for example, when a white roof is turned dark brown or black in a period of a few years in use.

Nor is this problem, so widespread in areas such as the southern United States, particularly the gulf state area, confined necessarily to such regions. Thus, discoloration of roofing surfaces by the growth of algae and/or fungi has also been found in the northern part of the United States, particularly so in areas along rivers and lakes and along the northern coastal regions. While home owners and others have been aware of this discoloration problem for many years, effective, practical, commercially feasible solutions thereto have not been forthcoming. The problem of roofing granule discoloration, therefore, has remained a major marketing problem for the roofing industry.

For many years, this problem of roofing granule discoloration was believed to be caused only by fungi, as is the case with respect to some outdoor paint surfaces. Many different types of fungi have, in fact, been isolated from discolored roofing surfaces. More recently, however, it has been learned that other organisms contribute principally to this discoloration and have been identified as terrestrial blue-green algae of the Cyanophyta division. Such algae are transferred through the air as spores and/or vegetative matter and deposited on roofing surfaces where they thrive and grow. Natural pigments produced by the algae add to the dark discoloration of the roof, which is generally first noticeable in spots that develop into dark vertical streaks that gradually darken until the entire roof becomes a totally discolored black within 5 to 15 years. Predominant algae thus identified from infested roofing shingles include *Gloeocapsa magma*, *Tolypothrix byssoidea*, Nostoc sp. and Scytonema sp. In general, metallic algicides that are effective in retarding the biological growth of such algae are likewise effective in similarly retarding the growth of fungi. The incorporation of a metallic algicide in the color coat of roofing granules, therefore, has heretofore been proposed in order to inhibit or prevent the discoloration of roofing surfaces containing such granules as a result of algae and/or fungi growth.

The incorporation of a metallic copper algicide in the color coat of roofing granules was disclosed in the Skadulis patent, U.S. Pat. No. 3,528,842. Skadulis particularly proposes the incorporation of copper algicides that are substantially water-insoluble but that have limited solubility in acidic solutions, e.g., $Cu_2O$. Highly water-soluble copper algicides, such as $CuSO_4$, were indicated as being ineffective for this application since it was suggested that such algicides would be leached out of the color coat very rapidly, i.e., within a few months, so that the resistance to algae growth and roofing discoloration would not be effective over any reasonable length of time. Skadulis also indicated that virtually water-insoluble compounds, such as $CuO$, would not be effective because, it was suggested, of insufficient solubility thereof in rainwater and dew (Column 2, lines 24–44). Similarly, slightly soluble zinc algicides were disclosed for incorporation in the color coat of roofing granules in the McMahon patent, U.S. Pat. No. 3,507,676. As was pointed out in the McMahon patent in Column 2, lines 58–65, such zinc algicides are effective when employed in an amount constituting at least about 1 percent by weight of the base mineral granules, i.e., about 20 lbs. of the zinc algicide compound or metal per ton of granules.

The incorporation of particular copper or zinc algicides in the color coat of roofing granules, in the manner and in the quantities taught by the Skadulis and McMahon patents, imparts a desirable resistance of roofing surfaces containing such granules to discoloration upon exposure to atmospheric weathering. The teachings of these patents, however, have not led to the development, commercial availability and use of algicidal roofing granules providing the desired degree of algae and/or fungi resistance over an extended period of time at economically competitive cost. In part, of course, this unavailability of a totally satisfactory algicidal roofing granule reflects the continual desire in the roofing industry for a more effective algicidal effect from a roofing granule of ever diminishing incremental cost to achieve such an algicidal effect. While the prior art techniques have thus imparted an algicidal effect to roofing granules, an enhanced algicidal effect provides a further assurance of the desired toxic effect of the granules in retarding biological growth of algae and/or fungi, thereby enhancing the quality of the roofing surfaces containing such granules. In addition, a more effective algicidal granule may also tend to enhance the period of time over which the algicidal roofing granules provide resistance of the roofing surfaces incorporating same to discoloration upon atmospheric weathering in use. This also enhances the quality of the roofing material, and of the algicidal granules therein, particularly for marketing and use in humid environments conducive to the growth of such algae and/or fungi.

An important factor concerning the length of time over which the algicidal properties of a roofing granule are effective is, of course, the weathering characteristics of the granule color coating or coatings. In the event the color coating containing an algicidal ingredient is subject to relatively appreciable weathering during use in roofing surfaces exposed to rain, dew and other atmospheric conditions, an undue loss of the algicidal content will occur. By such loss is meant the removal of the algicidal material from the roofing granules and from the entire surface of the roof under conditions other than those in which algicidal ions are released and slowly leached over the roofing surface to provide the desired toxic effect on biological growth of algae and/or fungi. One major contributing cause for relatively poor weathering characteristics and a consequent loss of the algicidal content of roofing granules has been the general assumption that a highly or totally water insolubilized color coating would be of such a tight, non-porous nature as to effectively prevent the desired leaching of algicidal materials therefrom. Full utilization of the algicidal content of the color coating was, therefore, believed inconsistent with the provision of a tight, durable weather-resistant color coating. The weathering characteristics of the algicidal roofing granules heretofore available in the art have, as a result, been less favorable than is generally desired in ordinary commercial applications.

Any incorporation of metallic algicides in an otherwise conventional roofing granule coating in order to achieve the necessary or desirable algicidal effect necessarily adds an incremental cost to the roofing granule and to the roofing material incorporating such an algicidal granule. While the desired toxic effect is a necessary or highly desirable feature of the algicidal roofing granule, the providing of this property or function is an expense item that, from a marketing viewpoint, must be minimized to the fullest possible extent. The use of minimum quantities of metallic algicides to produce a desired level of effectiveness over an extended period of time is, therefore, highly desirable. In this regard, it should be noted that the algicidal granules of McMahon require the incorporation of a relatively large amount of zinc for effective algicidal action as noted above. As the amount of metallic algicide required for effective action increases, the cost of the resulting algicidal granule is directly increased thereby. In addition, the use of relatively large amounts of metallic algicides frequently requires the incorporation of pigment in the granule coating in amounts in excess of that otherwise required to achieve a desired roofing granule color. As the amount of $Cu_2O$ employed is increased, for example, the amount of $TiO_2$ pigment that must be employed in the granule coating composition to produce a white roofing granule is also generally increased. Such an additional requirement necessarily adds to the overall cost of the algicidal roofing granule product and of roofing materials made therefrom. Furthermore, the requirements in accordance with the teachings of the prior art tend to limit or restrict the metallic algicidal materials that can be employed in a manner not necessarily consistent with the economic availability and feasibility of such materials in any particular application. Optimum flexibility as to the metallic algicides employed is, therefore, another desirable aspect in the providing of roofing granules having algicidal properties.

It is an object of the present invention, therefore, to provide improved algicidal granules.

It is another object of the invention to provide algicidal granules having an enhanced ability to retard the biological growth of algae and/or fungi.

It is another object of the invention to provide algicidal roofing granules having effective algicidal properties at more economical metallic algicide levels.

It is another object of the invention to provide algicidal roofing granules having enhanced flexibility as to the metallic aligicides employable therein.

It is a further object of the invention to provide roofing surfaces having an enhanced resistance to discoloration during extended periods of exposure to atmospheric weathering.

It is a further object of the invention to provide roofing surfaces incorporating algicidal roofing granules having an enhanced toxic effect in retarding biological growth of algae and/or fungi.

It is a further object of the invention to provide improved algicidal granules having enhanced weathering characteristics.

It is another object of the invention to provide algicidal roofing granules having enhanced resistance to atmospheric weathering and an enhanced period of time for effective algicidal action upon exposure to atmospheric weathering.

It is a further object of the invention to provide roofing surfaces incorporating effective algicidal roofing granules whose algicidal effect is continued over extended periods of time upon exposure to atmospheric weathering.

With these and other objects in mind, the invention is hereinafter described in detail, the novel features thereof being particularly pointed out in the appended claims.

SUMMARY OF THE INVENTION

Novel algicidal granules having enhanced weathering characteristics are employed in roofing compositions so as to provide a highly effective effect in retarding the biological growth of algae and/or fungi over extended periods of time upon exposure to atmospheric weathering. The algicidal granules having such enhanced weathering characteristics are coated with an inner and an outer coating each of which contains algicidal compounds, the coatings being water insolubilized under such conditions as to produce tight, weather-type coatings. Upon exposure to rain and dew, such coatings are nevertheless sufficiently moisture permeable to permit ionization of the algicidal compounds contained in the coatings so as to release algicidal ions therefrom that are thereupon slowly leached from the granule coating during such periods of rain and dew to achieve the desired toxic effect inhibiting or preventing the growth of algae and/or fungi over the entire roofing surface. The algicidal content of the inner coating is in excess of that of the outer coating so, it is believed, as to provide a highly desirable reservoir of algicidal ions slowly leached from the granule coatings generally after the substantial depletion of the algicidal content of the outer coating. Preferably, the algicidal content of the inner coating will be at least twice the algicidal content of the outer coating to enhance the desired algicidal life of the roofing granules and, thus, the period of time over which the roofing surfaces incorporating such granules retain the desired resistance to algae and/or fungi discoloration. The desired toxic effect inhibiting the biological growth of such algae and/or fungi is enhanced by incorporating copper and zinc algicides in the granule coatings. The release and slow leaching of both zinc and copper ions produces a bimetallic effect that is particularly effective in retarding the growth of algae and/or fungi. Relatively small amounts of such copper and zinc algicides can be effectively employed, with the total zinc algicidal content and the total copper algicidal content present in the inner and outer coatings being in the range of from about 0.05 to about 0.5 percent by weight, based on the total weight of base mineral granules employed. In the preparation of the novel algicidal granules of the invention a first pigmented, inorganic alkali metal silicate-clay composition containing the desired algicidal compounds is applied to the base mineral granules and fired at a temperature of about 500° to about 800°F to form a moisture permeable, partially water insolubilized inner coating on the granules. A second pigmented, inorganic alkali metal silicate-clay composition containing a lesser algicidal content is then applied to the granules, which are then fired at a temperature of from about 800° to about 1,200°F to form a moisture permeable, tight, durable, weather-resistant, waterinsolubilized outer coating on the algicidal roofing granules. This second firing treatment also serves to impart the same tight, weather-resistant characteristics to the inner coating, without adversely effecting the desired moisture permeability of the coatings. Upon exposure of roofing surfaces containing the novel algicidal granules of the invention to atmospheric weathering over extended periods of time, therefore, the granule coatings are highly weather resistant, but have sufficient moisture permeable so that such moisture is able to permeate the coatings during periods of rain and dew. This presence of moisture in the tight, durable, water-insolubilized coatings permits the ionization of the copper algicides, zinc algicides, or combination thereof, in the coatings, thus releasing copper and zinc ions therefrom. The copper and zinc ions thus released are thereupon slowly leached from the roofing granule coatings to provide the desired toxic effect, the leaching rate from the weather-resistant coatings being sufficiently slow so as to extend the algicidal life of the granules over a highly desirable period of time, the leaching rate nevertheless being sufficiently great so that the toxic effect over such an extended period of time is sufficient to enhance the resistance of the roofing surface to discoloration over such an extended period of time.

DETAILED DESCRIPTION OF THE INVENTION

In the practice of the present invention, roofing surfaces containing the novel algicidal granules of the invention release algicidal ions slowly over an extended period of time during periods of rain and dew during exposure to atmospheric weathering. A particularly effective toxic effect is achieved in retarding the biological growth of algae and/or fungi, at economically feasible algicidal contents and overall granule cost, by incorporating both copper and zinc algicides in the granule coatings since the leaching of both copper and zinc ions from the base granule color coating enhances the resistance of the entire roofing surface to discoloration, even in those humid environments that are normally very conducive to the growth of such algae and/or fungi. When employed in the water insolubilized, durable, weather resistant, moisture permeable coating system of the present invention, as hereinafter set forth in detail, the algicidal compounds of the invention are particularly effective over very extended periods of time, enhancing the quality of the roofing surfaces incorporating such algicidal granules and providing a desired resistance to discoloration effectively over the reasonable life of the roofing surface.

The enhanced algicidal effect obtained has been found to pertain to the use of copper and zinc algicides that can be either slightly soluble or very soluble in water. It has been found advantageous, in fact, to employ a combination of such algicides to assure an initial release or leaching of sufficient algicidal ions to assure against the early development of algae and/or fungi upon atmospheric exposure of the roofing surface in environments conducive to the growth of algae and/or fungi, while also assuring a reservoir supply of algicidal ions for subsequent release over the extended algicidal life of the granules to impart the desired resistance to discoloration of roofing surfaces incorporating such granules over extended periods of use. In this regard, the effective algicidal control that is achieved is not believed to be related essentially to the solubility of the metallic algicide employed per se, but to the ionization mechanism that permits the formation of algicidally effective copper and zinc ions that are subsequently released or leached from the color coating during periods of rain or dew. While a relatively highly water soluble copper algicide, e.g., copper sulfate, will tend to release algicidal copper ions more readily than an algicide having relatively low water solubility, e.g., $Cu_2O$, such relatively greater release of copper ions from copper sulfate granules during periods of heavy rain or prolonged periods of time has actually been found to contribute to effective algicidal control over the entire roofing surface. It is generally desirable, of course, that a sufficient reservoir of more slowly releasable algicidal ions are also present to assure that the desired toxic effect extends over a prolonged period of time. Contrary to the expectations flowing from the prior art teachings, however, the rate of ionization and the release or leaching of copper ions from the water insolubilized, tight, weather resistant, but nevertheless moisture permeable color coatings of the present invention is sufficiently slow, even with highly water soluble algicidal compounds, so that the desired toxic effect is not dissipated or depleted in a relatively short period of time as heretofore believed in the art.

With respect to metallic algicides known to have a relatively low solubility in water, it should also be noted that such algicides, e.g., cuprous oxide, has a somewhat greater solubility under acid conditions than under either alkaline or neutral conditions. The color coated roofing granules of the present invention are initially slightly alkaline in nature. After a period of weathering, however, this alkalinity is reduced, and the surface of the roofing granules may become slightly acidic due to the effects of acids resulting from degradation of the asphaltic portion of the roofing materials and from various atmospheric sources that contact the roofing surface. A variety of factors, therefore, are pertinent to the effective resistance of roofing surfaces containing the algicidal granules of the present invention to discoloration during extended use. While the solubility of the particular algicides incorporated into the color coating of the roofing granules is one significant aspect of the algicidal control operation, the fundamental and essential feature is the ionization of the copper and/or zinc algicides in the color coatings of the invention, and the slow release of algicidal ions from the highly weather resistant, water insolubilized color coatings of the invention. This slow leaching of algicidal ions from the weather-resistant coatings produces the effective retardation of biological growth of algae and/or fungi under such controlled conditions that the effective algicidal action is continued over an extended period of years, thus effectively inhibiting or preventing the unsightly discoloration of the roofing surface due to the growth of algae and/or fungi over the reasonable life of the roofing surface. As the highly desired algicidal action achieved in the practice of the present invention can be achieved with a variety of desirable metallic algicidal components, an inherent flexibility exists with respect to the present invention that is, of itself, a significant advantage to the roofing industry. Algicidal compounds that are economically attractive, but which had not heretofore been desirable for use in algicidal roofing granules, may thus be employed. In addition, the roofing granules may employ a combination of algicidal compounds, including those not heretofore deemed acceptable, to assure effective initial and long term toxic properties, all within an economically feasible algicidal control system.

The copper and zinc algicides employed in the roofing granules of the present invention may be any of the available copper and zinc compounds generally known as possessing algicidal properties and that, when employed in the granule color coatings of the invention, are ionizable upon contact with moisture permeating the color coatings during periods of rain and dew. It is this ionization of the algicidal compounds and the resulting slow release and leaching of algicidal ions from the color coating for passage over the roofing surface that produces the desired effect of retarding biological growth of algae and/or fungi on the roofing surface. As suggested above, a wide variety of suitable copper compounds can be employed in the practice of the invention. Illustrative thereof is, on the one hand, $CuSO_4$, not heretofore deemed suitable for use in algicidal granules because of its water solubility. On the other hand, compounds such as $CuO$, not heretofore deemed suitable because of a very low water solubility, can also be employed. Those copper compounds heretofore deemed suitable for use in algicidal granules, because of a limited water solubility, are also suitable and desirable, of course, for use in the present invention. $Cu_2O$ and $Cu_2Br_2$ are illustrative examples of such copper algicidal compounds. As heretofore indicated, a solubility per se of the algicidal compounds employed is not deemed decisive for the purpose of the present invention. The slow release of algicidally effective ions from the granule color coatings of the invention under the conditions encountered during atmospheric weathering is at the essence of the present invention, regardless of the relative water solubility of the algicidal compounds employed under conditions unrelated to those encountered when such algicidal compounds are employed in the color coatings of roofing granules as herein provided.

The algicidal compounds used herein slowly release toxic ions that inhibit or prevent unsightly discoloration of roofing surfaces due to biological growth. As indicated above, such discoloration is now believed to be caused principally by various algae, although fungi spores are also found to exist on roofing surfaces susceptible to biological growth. As a result, some confusion or imprecision has persisted in general discussions of roofing discoloration, with such discoloration sometimes being casually referred to as fungi discoloration even though the biological growth of algae may actually be the major contributing factor therein. For this reason, therefore, the present invention is disclosed and claimed herein with respect to the inhibition or retardation of the biological growth of "algae and/or fungi." It will be understood that the slow release of toxic ions from the algicidal roofing granules of the invention is effective, in any event, in inhibiting or preventing the unsightly discoloration of roofing surfaces due to biological growth regardless of the general characterization of such undesired growth as algae growth or fungi growth in ordinary consideration of roofing performance with respect to resistance to discoloration due to biological growth. Suitable compounds having the desired algicidal properties will, in any event, generally be suitable also for fungi control purposes. In this regard, it should be noted that, although phosphates are known nutrients for fungi, copper phosphate can be used in the present invention for effective action, at the dosage levels indicated, in preventing discoloration due to biological growth of algae and/or fungi. Illustrative of other copper materials that can be employed are copper chloride and copper metal beads.

The zinc algicide employed in the present invention will also be any suitable zinc-containing material that effectively releases the zinc ions upon contact with moisture within the color coatings of the present invention during atmospheric weathering under conditions of rain or dew. As with the copper algicidal compounds referred to above, zinc ions are slowly released and leached from the color coating of the roofing granule upon contact with moisture and the subsequent ionization of the zinc compound, with the zinc ions thus released being slowly leached from the color coating for effective algicidal toxic action over the surface of the roof. The most generally preferred zinc algicide from an overall commercial viewpoint is zinc oxide. Other zinc-containing compositions, such as $ZnS$ and metallic oxide pellets or particles, can also be employed in the practice of the invention.

The copper and zinc algicides incorporated into the color coatings of the invention are each employed in algicidally effective amounts generally within the knowledge of the art as reflected by the McMahon and Skadulis patents referred to above. Thus, the metallic zinc algicide, when used alone, will generally be employed in an amount from about 0.5 to about 2 percent by weight or more, with at least about 1 percent by weight based on the weight of base mineral granules being generally preferred. Similarly, the copper algicide, when used alone, will be employed in an amount of from about 0.1 to about 1 percent by weight based on the weight of base mineral granules, with at least about 0.5 percent and above being employed in preferred embodiments of such use of copper algicides. When copper and zinc algicides are employed together, they can each be advantageously employed in relatively small amounts ranging from about 0.5 to about 0.5 percent by weight based on the total weight of base mineral granules employed. The copper and zinc algicidal contents will each be preferably within an amount within the range of from about 0.1 to about 0.4 percent by weight based on the weight of said base granules. A zinc algicidal content of the color coatings of from about 0.15 to about 0.25 percent by weight has been found particularly convenient in applications of the invention. Similarly, a copper algicidal content within the range of from about 0.25 to about 0.35 percent by weight of base granules has been found advantageous in many practical applications of the invention. It will be understood that the copper and zinc algicidal contents referred to above relate to the overall copper and zinc contents present in the inner and outer granule coatings of the present invention, the algicidal content of the inner granule coating being in excess of that of the outer granule coating to effectively enhance the ability of the roofing granules to provide the desired algicidal effect over an extended period of time.

While the invention is described herein with reference to the use of copper and zinc algicides, and combinations thereof, it will be understood that other metallic algicides, such as cadmium, nickel and silver metal and oxides, can also be employed in the novel two coat algicidal granules of the invention, alone or in combination with one another or with said copper and zinc algicides. Non-metallic materials having algicidal properties as herein discussed, i.e., the ability to ionize and slowly release toxic ions, can also be employed in like manner as available. It will be understood that in such embodiments, the algicidal content of the inner coating will be in excess of that of the outer coating as herein provided. In the preparation of such granules, of course, the granules can advantageously be fired initially at the indicated lower temperature range to partially insolubilize the inner coating, the granules being fired thereafter at the higher temperature range to fully insolubilize both the inner and outer coatings.

As in the preparation of conventional roofing granules, the algicidal roofing granules of the present invention are prepared by using any suitable base raw mineral granules, such as greenstone or netheline syenite. In the conventional production of artificially colored roofing granules, an alkali metal silicate-clay coating or coatings is applied to the base mineral granules and fired to produce moisture permeable, substantially water insoluble, durable, pigmented coating on the base mineral granules. Two general methods are commonly employed for thus color coating base mineral granules, both of which can be employed in the practice of the present invention. In one method, referred to as the continuous paint slurry process, crushed and screen graded mineral granules are constantly mixed with a paint slurry containing pigments, clay and sodium silicate in suitable mixing equipment. The thus-color coated granules are then heated to a temperature that may range from about 600° to about 1,200°F in a rotary-type kiln. Dehydration of the silicate occurs, and an extremely hard color-coated granule is obtained. When the granules are fired at lower temperatures, e.g., about 500°F, the conventional silicate-clay coating may require treatment by the addition of a pickling agent, such as $AlCl_3$ solution, in order to properly insolubilize the coating. Upon cooling, the color coated granules are generally post treated with processing oil and/or coating compositions as is known in the art.

In a second, batch-type process employed in the conventional color coating of roofing granules, essentially the same coating, firing and post-treatment operations are performed except that a weighed amount of crushed and screen graded base mineral granules is mixed with a weighed amount of pigments and clay, and the silicate is added to this premix in a suitable mixer, commonly a tumbling barrel-type mixer. The firing and post treatment of the color coated granules in such conventional operations are as referred to above with respect to the continuous process.

In the practice of the present invention, the desired algicidal properties are imparted to the roofing granules by incorporating copper and/or zinc algicides into the paint formulation in accordance with conventional color coating of the base mineral granules in accordance with industry accepted techniques as indicated above or any other suitable granule coating technique. In the present invention, however, it will be understood that more than one such color coating is applied to the base mineral granules. It will further be understood that, in the practice of the present invention, the total algicidal content of the second or outer granule coating will be less than that of the first or inner granule coating. Preferably, the algicidal content of the inner coating will be at least about twice the algicidal content of the outer coating as roofing granules prepared in this manner will have the desired ability to slowly release and leach algicidal ions having a highly effective toxic effect inhibiting or preventing algae and/or fungi infestation and growth upon initial application and use of roofing surfaces containing such granules, with a highly desirable reservoir of algicidal ions present in the inner granule coating so as to assure the continued algicidal action over the reasonable life of the roofing surface.

As previously indicated, a highly desirable flexibility exists with respect to the copper and/or zinc algicides employed in the inner and outer color coatings of the present invention. Thus, more highly water soluble or alternately less highly water soluble algicidal compounds can be employed in the inner and outer coatings, and varying proportions of such materials may also be employed to achieve optimum algicidal leaching properties for any given roofing application. In addition, of course, it has heretofore been indicated that an enhanced effect can also be achieved by employing both copper and zinc ions in the color coatings of the invention, the slow release of both copper and zinc ions from the durable, weather resistant coatings of the present invention producing a bimetallic toxic effect that is particularly effective in preventing algae and/or fungi discoloration of the roofing surface containing such granules. It is within the scope of the present invention to employ any desirable proportion of zinc and copper algicidal compounds within the overall amounts heretofore indicated, and to employ any desired relative proportions of copper and zinc compounds in the inner and outer granule coatings. It is also within the scope of the invention, of course, to employ only copper or zinc algicides in one such color coating, but to employ the desirable combination of copper and zinc algicidal compounds in the other granule color coating.

From previous attempts to produce algicidally effective roofing granules, it has previously been thought desirable, if not essential, to incorporate the algicidal compound in a color coating not fully water insolubilized so that the algicidal compound could be effectively released. As previously indicated, it was heretofore believed that particular water solubility characteristics were essential for effective algicidal action in roofing granules. It was also believed that a tight, durable, fully water insolubilized color coating would inhibit the dissolving of the algicidal compound in the moisture encountered upon atmospheric weathering. In a similar manner, it was heretofore believed that a highly water-soluble compound present in a partially water insolubilized coating would be dissolved so rapidly as to be entirely depleted within a matter of a few months, leaving the roofing granule thereafter with no effective algicidal control properties. Previous efforts, therefore, focused on the use of slightly water-soluble compounds present in color coatings not fully water insolubilized. Flexibility of production and of properties was therefore inhibited, and the roofing granules thus prepared did not have the weathering characteristics otherwise deemed desirable, such as those achieved in conventional non-algicidal granules that were fully water insolubilized.

Contrary to the limitations and deficiencies of such previous efforts, it has been found in the practice of the present invention that the provision of suitably weather resistant granule color coatings is not incompatible with the desired release of algicidal ions from the algicidal content of the inner and outer granule coatings herein provided. To the contrary, such highly desirable weather-resistant properties are achieved and, at the same time, the algicidal contents of the outer and inner granule coatings are contacted effectively by atmospheric moisture during periods of rain and dew to permit the desired release of algicidal ions from the inner and outer coatings. The amount of moisture penetrating the outer and inner granule coatings of the present invention during periods of rain and dew is sufficient to result in sufficient ionization of copper and/or zinc compounds to produce the desired algicidal effect. The ionization of copper and zinc compounds upon contact with atmospheric moisture within the moisture-permeable but weather-resistant coatings has thus been found to cause the slow release and leaching of sufficient algicidal ions for effective toxic effect, inhibiting or preventing the growth of algae and/or fungi on the roofing surfaces. The amount of moisture that thus permeates into the outer and inner tight, durable, weather resistant, fully water insolubilized outer and inner coatings of the present invention, however, does not cause such a rapid ionization and release of ions as to deplete the algicidal content of the coatings within an unacceptably short period of time. Even with respect to such highly water-soluble materials as copper sulfate that may be employed in such coatings, the wash-out effect occasioned by the relatively greater ease with which algicidal ions are released therefrom as compared with less water-soluble compounds, is sufficiently slow so that the desired algicidal effect thereof is continued over a suitably extended period of time. The inner and outer granule coatings of the present invention can thus be fully insolubilized to produce the desired weather-resistant characteristics of the granule coatings. For this purpose, the granules are fired after the application of the second coating to a temperature of from about 800° to about 1,200°F or above, generally to about 850°F or above. It should be noted that this firing of the second or outer coating serves also to fully water insolubilize and otherwise render tight and durable the inner or first granule coating. In the practice of the present invention, therefore, this first or inner granule coating is fired at a lower temperature sufficient to partially water insolubilize the inner coating so that the thus partially treated granules can be handled, stored, or transported, as required, prior to the application of the second color coating thereto as hereinabove indicated. In the production of the algicidal granules of the present invention, therefore, a first pigmented, inorganic alkali metal silicate clay composition containing the subject algicidal compounds is applied to base mineral granules. The thus-treated granules are then fired at a temperature of from about 500° to about 800°F to partially water insolubilize this first or inner granule coating. A second pigmented, inorganic alkali metal silicateclay composition containing a lesser amount of algicidal compounds is thereafter applied to the granules having the first, partially water insolubilized coating thereon. The thus second-treated granules are then fired at the higher temperatures indicated above, to form the desired moisture permeable, durable, fully water insolubilized outer coating on the roofing granules, this coating having the highly desirable weather-resistant characteristics desired in the art. At the same time, the second firing at the higher temperatures indicated serves also to fully water insolubilize the inner coating, imparting the desirable overall weathering characteristics to the inner coating as well, while nevertheless resulting in inner and outer coatings having moisture permeability characteristics such as to allow sufficient moisture to permeate therein to achieve the desired ionization and slow release of algicidal ions from the color coatings during extended periods of exposure to atmospheric weathering in use.

The asphaltic roofing compositions in which the novel algicidal roofing granules of the present invention are incorporated are roofing shingles, rolled roofing, and the like, having an organic asphalt-saturated felt base that is coated with an asphalt of a higher softening point and surfaced with base mineral granules having the subject inner and outer color coatings thereon. The felt layer is customarily composed of wood fibers, either alone or in combination with paper pulp, repulped paper and/or rags, asbestos fibers, or the like. Such felts are generally referred to in the industry as roofing felts. The saturants most commonly employed to saturate the felt layer include residual oil, soft residual asphalt and soft blown petroleum asphalt, and mixtures thereof. Preferred saturants generally have a ring and ball softening point of approximately 120° to 130°F and a penetration of approximately 60 at 77°F.

This saturated felt layer is then coated with an asphalt of a higher softening point and lower penetration from that of the saturant. Preferred materials will generally have a ring and ball softening point of approximately 175° to 260°F and a penetration of approximately 10 to 50 at 77°F. Coating asphalts of this type include native and sludge asphalts, fatty acid pitches and the like. In accordance with customary practices in the art, this asphalt coating layer is commonly embedded with powdered or fibrous fillers of inorganic or organic origin, such as powdered silica (sand), limestone, slate dust, clay, etc., and mixtures thereof. Upon application of the asphalt coating to the saturated felt layer, the color coated roofing granules of the invention are applied to the asphalt layer surface, and the resulting roofing surface is then passed through suitable rollers and presses, quenched and otherwise treated and handled in accordance with conventional practice in the roofing industry.

The following are illustrative examples of the novel algicidal roofing granules of the present invention, including the production thereof, it being understood that these examples are presented for the purposes of illustration only, and are not to be construed as limiting the scope of the invention as set forth in the appended claims.

EXAMPLE 1

A first coat paint slurry formulation was prepared by mixing base mineral granules, sodium silicate, clay, water and a combination of copper and zinc algicidal compounds having the following concentrations expressed in pounds per ton of the base mineral granules with which the slurry formation is thereafter mixed:

| Components | lbs./ton Granules |
| --- | --- |
| $H_2O$ | 55.0 |
| Sodium Silicate | 50.0 |
| $TiO_2$ | 15.0 |
| Clay | 40.0 |
| $Cu_2O$ | 2.0 |
| $CuSO_4$ | 2.0 |
| ZnO | 3.0 |

After mixing the base mineral granules and the above paint slurry, the thus paint-coated granules were fired in a rotary kiln at a temperature sufficient to partially water insolubilize the first or inner coating on the base mineral granules sufficiently to facilitate subsequent handling thereof. A second coat paint slurry formulation consisting of the following composition was mixed and was then applied to the dried granules having the first, partially water-insolubilized coating thereon:

| Components | lbs./ton Granules |
| --- | --- |
| $H_2O$ | 30.0 |
| Sodium Silicate | 70.0 |
| $TiO_2$ | 15.0 |
| Clay | 35.0 |
| $CuSO_4$ | 2.0 |
| ZnO | 1.0 |

The thus second color-coated granules were then fired in a rotary kiln sufficiently to fully water insolubilize both the second or outer coating and, at the same time, the first or inner coating. Both coatings were thereby rendered tight, durable, fully water insolubilized, while retaining sufficient moisture permeability to permit moisture penetration therein, ionization of the algicidal components, and the slow release and leaching of the copper and zinc ions therefrom during exposure to atmospheric weathering upon subsequent incorporation in asphalt coated base materials of conventional nature. Upon cooling of the algicidal roofing granules having the inner and outer coatings indicated above, the granules were post treated with conventional processing oil in accordance with conventional practice in the art.

EXAMPLE 2

Algicidal roofing granules were prepared in the manner indicated above with respect to Example 1 by the use of first and second coat paint slurry formulations as follows:

First Coat Paint

| Components | lbs./ton Granules |
| --- | --- |
| $H_2O$ | 55.0 |
| Sodium Silicate | 50.0 |

-Continued

First Coat Paint

| Components | lbs./ton Granules |
| --- | --- |
| $TiO_2$ | 20.0 |
| Clay | 40.0 |
| $Cu_2O$ | 5.0 |
| ZnO | 3.0 |

Second Coat Paint

| Components | lbs./ton Granules |
| --- | --- |
| $H_2O$ | 30.0 |
| Sodium Silicate | 70.0 |
| $TiO_2$ | 20.0 |
| Clay | 30.0 |
| ZnO | 1.0 |

The algicidal roofing granules prepared in accordance with the formulations of Examples 1 and 2 were embedded in asphaltic roofing compositions by conventional techniques and employed in both laboratory and field testing applications under conditions conducive to the growth of algae and/or fungi. The granules were employed in such roofing compositions in conventional amounts, generally about 35 lbs. of granules per 100 sq. ft. of roofing surface. Upon exposure to atmospheric weathering, the algicidal roofing granules of the invention, specifically as set forth in Examples 1 and 2 above, were found to be sufficiently moisture permeable so that, during periods of rain and dew, moisture could penetrate into the interstices of the outer coating and ultimately of the inner coating contacting therein the copper and zinc algicidal contents thereof. Upon contact with the moisture permeating into the color coatings, the copper and zinc algicidal materials were ionized so that copper and zinc ions were formed and slowly released from within the granule color coatings for migration to the outer surface thereof. As a result, copper and zinc ions were slowly leached from the roofing granules for passage over the surface of the roofing composition in which the subject granules were embedded. The rate of release and subsequent leaching of the algicidal granules during periods of rain and dew were found to be sufficient to produce a highly effective toxic effect in retarding the biological growth of algae and/or fungi on the surface of the test panels over extended periods of field testing. In such field testing, test sights in the United States and elsewhere were selected to provide conditions highly conducive to rapid algae development. Algicidal roofing granules and untreated control granules exposed under such algae conducive conditions were evaluated periodically to observe comparative effects having a meaningful relationship to the known performance of conventional roofing granules in ordinary usage under generally applicable weathering conditions. Meaningful comparative results, in some test locations, are observable within periods of time ranging from 6 months to 2 years. Under other somewhat less severe conditions, test periods of up to three or four years are required before valid conclusions can be reached on the basis of observable comparative results. Experimental algicidal roofing granules, including the novel granules of the present invention, were compared with one another and with untreated control granules exposed for the same period of time under the same set of conditions. In these comparative experimental runs, untreated base mineral granules were compared with such base mineral granules having a conventional color coating thereon, and with color coated granules having algicidal components therein in accordance with conventional practice, including those having a partially water insolubilized color coating, and with the algicidal granules having the two color coatings as described and claimed herein. Conventional amounts of sodium silicate, clay and water, together with $TiO_2$ pigment to produce a white roofing granule were employed in accordance with the proportions set forth in Examples 1 and 2 above for meaningful comparative rssults. A conventional firing temperature was employed to fully water insolubilize the non-algicidal color coated granules. Conventional post treatment of the fired granules with processing oil was employed on a uniform basis.

The comparative laboratory testing and field evaluations thus carried out serve to establish that the algicidal granules of the present invention have highly desirable weathering characteristics, comparable to those of conventional non-algicidal roofing granules, together with highly desirable algicidal properties suitable and capable for providing the desired toxic effect on the biological growth of algae and/or fungi over very extended periods of time in ordinary roofing composition service. Thus, during periods of rain and dew, atmospheric moisture is able to penetrate the weather resistant outer and inner coatings of the granules, contact the algicidal content thereof, and result in the slow release of algicidal ions from the algicidal components of said outer and inner granule coatings. The released algicidal ions, i.e., copper and/or zinc ions, are slowly leached from the color coatings so as to pass over the roofing surface and thus to exhibit the desired toxic effect, inhibiting or preventing algae and/or fungi infestation and growth. The resulting resistance of the roofing surfaces containing the algicidal roofing granules of the present invention is maintained over very extended periods of time as a result of the slow rate of copper and zinc ion release and leaching from the granule coatings. Sufficient algicidal ions are thus leached to provide the desired toxic effect, without the leaching of such excess algicidal ions as to so diminish or deplete the remaining algicidal content as to impair the continued ability of the roofing granules to release and leach algicidal granules over an extended period of time. Algicidal roofing granules fired at about 750°F to partially insolubilize the color coating containing the algicidal ingredient, on the other hand, was found to be subject to more severe atmospheric weathering, resulting in an undesired loss of the algicidal content of the color coating. The results obtainable with such conventional algicidal roofing granules are not deemed sufficiently favorable, from an overall viewpoint, as to fully justify the necessary premium cost to compensate for the addition of the algicidal ingredient in the color coating formulation of the algicidal roofing granules known in the art.

The laboratory testing and field evaluations established that the presence of both copper and zinc compounds in the color coatings of the present invention produce a bimetallic effect that is particularly useful in preventing algae and/or fungi infestation and growth. The use of either copper or zinc algicides alone in accordance with the present invention, however, exhibits a desirable toxic effect in retarding the biological growth of algae and/or fungi over extended periods of time. In either embodiment of the invention, the roofing granules of the present invention have highly advantageous weathering characteristics because of the durable, fully water insolubilized, tight nature of the inner and outer color coatings that minimize any loss of algicidal material upon exposure to severe weathering conditions in use.

In accordance with prior art expectations concerning the presence of an algicidal compound in the granule color coating, the algicidal compound would preferably be as accessible to the surface as possible in a form facilitating the dissolving of the compound in moisture during periods of rain or dew. As determined in the subject laboratory and field testing, however, the providing of a major proportion of the algicidal components in the inner granule coating, with the inner coating algicidal content being preferably at least twice that of the outer coating, and fully insolubilizing both coatings, does not inhibit or restrict the desired algicidal action, but actually enhances this algicidal action over an extended period of time. Not only are weathering losses minimized, but the algicidal content of the inner coating is believed to serve as an effective reservoir of algicidal ions permitting the desired toxic effect to be extended and maintained for significant periods of time beyond the depletion of algicidal ions in the outer coating. In the production of the algicidal ions, however, an advantageously lower firing temperature can be employed in the initial firing operation, contributing to the favorable overall economics of the providing of a practical and effective algicidal roofing granule for use in commerical practice.

In an overall commercial evaluation of the benefits achieved in the use of algicidal roofing granules, a variety of factors must be taken into account, including the degree of algae control achieved, the significance of such control in terms of the ordinary life of the roofing surface, the esthetic effect of even moderate algae growth, particularly on white or light colored roofs, including the subjective marketing effect on the homeowner and home builders, all in light of the necessary incremental increase in the price of roofing material to achieve whatever degree of algae control is obtained. The particularly effective results achieved by use of a combination of both copper and zinc algicides, it has been found, are achieved at zinc and copper algicidal levels sufficiently low as to further greatly enhance the overall commercial significance and importance of the present invention. Thus, roofing granules containing a total zinc content of from about 0.05 to about 0.5 percent by weight based on the weight of granules, with the zinc algicidal content being in either or both of the granule coatings represent a highly significant factor in that results employing zinc algicides alone, i.e,, in the absence of copper algicides, have been found totally ineffective for algicidal control purposes in amounts less than about 1 percent by weight based on the weight of base granules. In the present invention, however, the relatively low zinc levels indicated are highly effective in combination with equally low copper algicide levels, namely from about 0.05 to about 0.5 percent by weight of said copper algicides based on the weight of base granules employed. The results achieved in inhibiting or preventing algae and/or fungi growth by the use of both copper and zinc algicides in the two color coat granules of the invention represent a significant improvement over the algicidal effect achieved by the same copper algicides alone at the same overall algicidal content.

This embodiment of the present invention, therefore, permits the achieving of an enhanced result at highly desirable overall algicidal levels resulting in an economically acceptable incremental cost for imparting the effective algicidal properties achieved. As the bimetallic toxic action of the granules of this embodiment of the invention is effective over extended periods of time by the slow release of copper and zinc ions, particularly from the inner coating where a major portion of the algicidal material is present, the commercial significance of the subject granules is further enhanced. In addition, of course, the subject granules are subject to minimum loss of algicidal effectiveness due to weathering effects because of the provision of weather resistant, durable, fully water insolubilized color coatings. The problems of unsightly roofing discoloration can thus be minimized over the ordinary life of the roofing surface by incorporation therein of the subject granules of the invention. In addition, the flexibility as to the nature of the specific zinc and copper algicides employed, deviating from the restrictions thereof previously believed applicable in the art, further enhances the commercial suitability and significance of the invention. It should also be noted that the incremental $TiO_2$ or other conventional pigment content of the color coating to offset the color effect of the algicidal compounds employed is reduced as the amount of such algicidal compounds required for effective algae control is decreased. The present invention thus offers further economic and technical advantages relating to the provision of a practical and effective algicidal roofing granule. By means of the present invention, therefore, a significant solution to the troublesome problem of algae discoloration is available to the roofing industry in a practical, realistic and economically feasible manner.

Therefore, I claim:

1. Algicidal roofing granules having an enhanced ability, over an extended period of time, to leach algicidal ions to prevent or inhibit the growth of discoloring algae and fungi organisms upon atmospheric exposure of roofing surfaces containing such granules, comprising
   a. base mineral granules;
   b. an inner, moisture permeable, durable, water insolubilized, pigmented, fired, inorganic alkali metal silicateclay coating, said coating containing a mixture of zinc and copper algicides; and
   c. an outer, moisture permeable, durable, water insolubilized, pigmented, fired, inorganic alkali metal silicateclay coating, said coating containing a mixture of zinc and copper algicides, the total zinc algicidal content of said inner and outer coatings being in the range of from about 0.05 to about 0.5 percent by weight based on the total weight of said base granules, the total copper algicidal content of said inner and outer coatings being in the range of from about 0.05 to about 0.5 percent by weight based on the total weight of said base granules and the total algicidal content of said outer coating being less than that of said inner coating, whereby when said coated granules are incorporated into roofing compositions and exposed to atmospheric weathering algicidal ions are slowly leached from the outer coating during periods of rain and dew to retard the growth of algae and fungi, said inner coating serving as a reservoir of algicidal ions, thus assuring the continued leaching of algicidal ions from said granules during use over an extended period of time and assuring the effective utilization of the algicidal content of the overall granule coating, said inner coating also tending to fill in voids in the base mineral granules so as to assure a more uniform outer coating, enhancing the uniformity of the resistance of roofing surfaces containing said granules to discoloration during such extended periods of exposure to atmospheric weathering.

2. The algicidal roofing granules of claim 1 in which the algicidal content of said inner coating is at least about twice the algicidal content of said outer coating.

3. The algicidal roofing granules of claim 2 in which said zinc algicide is present in said inner coating in an amount at least about twice the zinc algicide content of said outer coating, said copper algicide being present in said inner coating in an amount in excess of that employed in said outer coating.

4. The algicidal roofing granules of claim 3 in which said zinc algicide comprises ZnO.

5. The algicidal roofing granules of claim 4 in which said copper algicide comprises $Cu_2O$.

6. The algicidal roofing granules of claim 4 in which said copper algicide comprises a mixture of cuprous and cupric algicides.

7. The algicidal roofing granules of claim 6 in which said cuprous algicide comprises $Cu_2O$ and said cupric oxide comprises copper sulfate.

8. The algicidal roofing granules of claim 7 in which said copper algicide in said outer coating consists essentially of copper sulfate and said copper algicide in said inner coating consists essentially of a mixture of copper sulfate and $Cu_2O$.

9. The algicidal roofing granules of claim 8 in which said outer coating contains about 2 lbs. of copper sulfate and about 1 lb. of ZnO per ton of base mineral granules, and in which said inner coating contains about 2 lbs. of $Cu_2O$, about 2 lbs. of copper sulfate and about 3 lbs. of ZnO per ton of said base granules.

10. The algicidal roofing granules of claim 5 in which said outer coating contains about 1 lb. of ZnO per ton of base mineral granules, and in which said inner coating contains about 5 lbs. of $Cu_2O$ and about 3 lbs. of ZnO per ton of said base granules.

* * * * *